Figure 1:
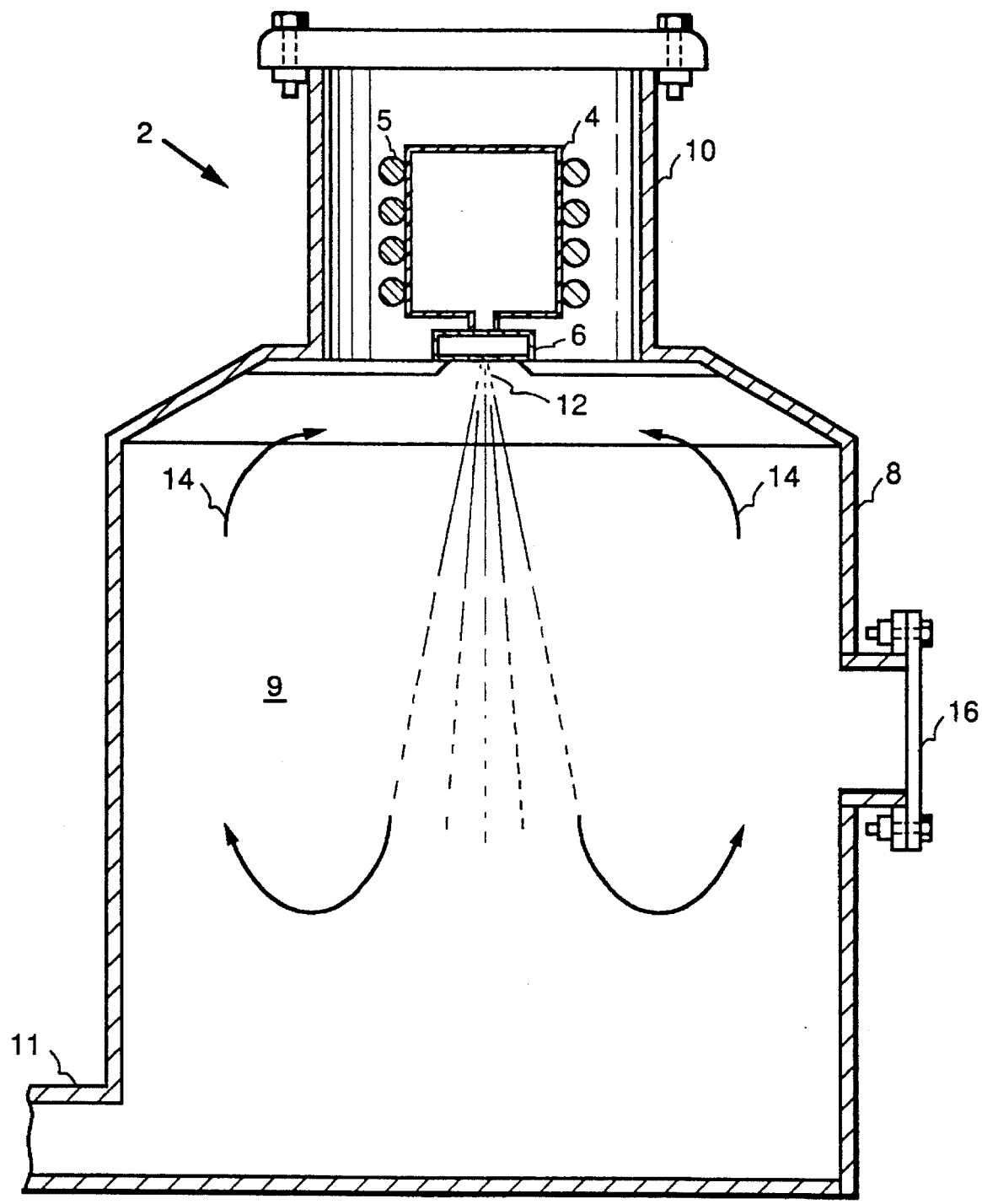

United States Patent [19]
Miller et al.

[11] Patent Number: 5,520,371
[45] Date of Patent: May 28, 1996

[54] APPARATUS AND METHOD FOR VIEWING AN INDUSTRIAL PROCESS SUCH AS A MOLTEN METAL ATOMIZATION PROCESS

[75] Inventors: Steven A. Miller, Amsterdam; Russell S. Miller, Ballston Spa, both of N.Y.

[73] Assignee: General Electric Company, Schenectady, N.Y.

[21] Appl. No.: 231,076

[22] Filed: Apr. 22, 1994

Related U.S. Application Data

[63] Continuation-in-part of Ser. No. 997,742, Dec. 30, 1992, abandoned, Ser. No. 997,740, Dec. 30, 1992, abandoned, Ser. No. 997,743, Dec. 30, 1992, abandoned, and Ser. No. 997,739, Dec. 30, 1992, abandoned.

[51] Int. Cl.$^6$ ............................................. B22F 9/08
[52] U.S. Cl. .................. 266/100; 266/202; 222/603
[58] Field of Search ......................... 266/99, 100, 202; 222/603; 425/7

[56] References Cited

U.S. PATENT DOCUMENTS

| | | | |
|---|---|---|---|
| 3,170,383 | 2/1965 | Hunt | 454/370 |
| 3,696,230 | 10/1972 | Friedrich | 219/121.75 |
| 4,488,032 | 12/1984 | Case, Jr. et al. | 219/121.34 |
| 4,738,528 | 4/1988 | Craft | 356/43 |
| 4,784,491 | 11/1988 | Penney et al. | 356/376 |
| 5,244,369 | 9/1993 | Miller et al. | 425/7 |
| 5,423,520 | 6/1995 | Anderson et al. | 266/202 |

OTHER PUBLICATIONS

LR Nerone, A–H Qureshi, "Mathematical Modeling and Optimization of the Electrodeless, Low–Pressure Discharge System," Transactions of IEEE, PESC 1993, pp. 509–514.

*Primary Examiner*—George Wyszomierski
*Attorney, Agent, or Firm*—R. Thomas Payne; William H. Pittman

[57] ABSTRACT

An apparatus, system and method for viewing an industrial process in an obscuring environment, such as molten metal atomization, is disclosed. An enclosure defining a chamber for containing a particulate form from atomized liquid metal has a nozzle for atomizing liquid metal mounted thereon in communication with the chamber whereby particles recirculate throughout the chamber. The nozzle being comprised of a cylindrical plenum means and a melt guide tube extending axially therethrough to an exit orifice. The plenum means is configured to provide a jet of atomizing gas converging in an atomizing zone extending from the exit orifice. A viewing means extends through the enclosure to a viewing orifice adjacent the atomization zone, the viewing means being configured to extend a field of view through the chamber to the atomization zone. A purging gas flow is provided in the viewing means to minimize atomized particles from contacting the window, and an image of the atomization zone is generated by viewing through the window.

19 Claims, 8 Drawing Sheets ns: 5,520,371

APPARATUS AND METHOD FOR VIEWING AN INDUSTRIAL PROCESS SUCH AS A MOLTEN METAL ATOMIZATION PROCESS

RELATED APPLICATIONS

This application is a continuation-in-part of Ser. No. 07/997,742, filed Dec. 30, 1992, now abandoned; Ser. No. 07/997,740, filed Dec. 30, 1992, now abandoned; Ser. No. 07/997,743, filed Dec. 30, 1992, now abandoned; and Ser. No. 07/997,739, filed Dec. 30, 1992, now abandoned, the disclosure of each is herein expressly incorporated by reference.

BACKGROUND OF THE INVENTION

The present invention relates to an apparatus and a method for viewing industrial processes in a dirty environment and more particularly relates to the viewing of the atomization of molten metal.

It is well known that direct observation or viewing by sensors, for example, optical sensors can be used for guidance or control of industrial processes. One of the major problems encountered with viewing by sensors is maintaining the clear and uninterrupted transmission of the optical elements through the window or path by which the industrial process is viewed. This problem can be substantial even with clean processes because of dust and smoke normally found in the work place. However, when a sensor must observe directly a process producing smoke, spatter, powder or other airborne debris, the problems of sensor path and window cleanliness can become critical, requiring that the process be stopped frequently to clean or change windows, or that some type of refreshable window mechanism or shutter be installed. Viewing sensors used for weld groove tracking, weld quality control, metal spraying, or molten metal atomization are good examples of devices which should tolerate a dirty atmosphere.

Close coupled gas atomization of liquid metal is being developed as a process for forming metal powders. In close coupled gas atomization, a cylindrical gas plenum having an inner chamber in communication with an annular orifice, or an annular array of discrete orifices, produce a jet which may be comprised of an array of jets, that converge below a melt guide tube extending axially through the gas plenum. A stream of liquid metal passing through the melt guide tube and exiting therefrom is atomized in the annular jet of atomizing gas converging in the stream.

When the gas atomization of liquid metal is commenced, there is an opportunity to view the atomization of the liquid metal from viewports in the atomization chamber. In the atomization process, the atomizing gas flows at supersonic speeds resulting in great scattering and recirculation of the particulate formed by the atomization process. Soon after the atomization starts producing powdered material, recirculating powder from the atomization process obscures the view. In fact, direct operator observation of the atomization nozzle is obscured within seconds after the process is initiated.

Information regarding the interaction between the atomizing gas and the liquid metal in an atomization zone below the nozzle can be obtained at the start of the atomization process, and before the viewing path to the atomization zone is obscured by the recirculating powder produced by the atomization process. However, it has not previously been possible to view the atomization process for more than a few seconds after the atomization has begun. Thereafter, the ability to observe the interaction that occurs in the atomizing zone below the nozzle tip is lost. Loss of observed information about the atomization zone is well recognized as being a major impediment to the successful adaption of control devices and strategies to provide process control. It is highly desirable to be able to observe the atomization at the atomization nozzle, and in the atomization zone below the nozzle over an extended period of time in order to provide process control.

Several important properties of metal powder, and the products formed from consolidation of the powder, are dependent on the as-atomized particle size. These properties include composition homogeneity, mechanical performance, e.g. strength, and toughness, as well as physical characteristics of the powder itself, e.g., particle shape, porosity, and flow qualities. Most of these properties improve as particle size decreases, however, powder handling becomes more complicated for finer powder because of caking, environmental contamination, pyrophorosity and other affects.

The strong dependence of metal powder properties on particle size translates into an increased demand for atomization process control that provides a predetermined particle size range, and minimizes the production of powder having a particle size above or below the predetermined range. Such process control can be improved by observation of the interaction of the atomizing gas jet and the liquid metal stream in the atomization zone.

Thus, there is a need for improved apparatus and methods for viewing industrial processes in obscuring environments, such as the close coupled atomization of molten metal to produce fine powders.

SUMMARY OF THE INVENTION

In carrying out the present invention in preferred forms thereof, we provide an apparatus, system and method for industrial applications, such as the close coupled atomization of molten metal to produce fine particles, for the observation and monitoring of industrial processes in an obscuring environment.

One method of the present invention includes viewing a molten metal atomization process in an enclosure defining a chamber for containing a particulate formed from atomized liquid metal comprises, directing a stream of molten metal into a converging jet of atomizing gas for atomizing the stream into droplets in an atomizing zone extending into the chamber, particles recirculate throughout the chamber. Providing a viewing means extending to adjacent the atomization zone, the viewing means having a transparent window spaced from the atomization zone so that a field of view extends through to the atomization zone. Providing a purging gas flow in the viewing means to minimize the atomized particles from contacting the window, and generating an image of the atomization zone by viewing through the window along the field of view.

The apparatus of the present invention, in one embodiment thereof, comprises an enclosure defining a chamber for containing particulate formed from atomizing liquid metal. A nozzle for atomizing liquid metal is mounted on the enclosure in communication with the chamber. The nozzle is comprised of a cylindrical plenum means, and a melt guide tube extending axially therethrough to an exit orifice. The plenum means is configured to provide an annular jet of atomizing gas converging in an atomizing zone extending from the exit orifice. A viewing means extends through the enclosure to a viewing orifice adjacent the atomization zone, the viewing means being configured to extend a field of view through the chamber to the atomization zone.

The viewing means is comprised of an annular housing extending from a first end to a second end defining a first inner channel therein. The housing having a mounting means to secure a camera in the first channel so the camera has a field of view extending from the second end. A sleeve extends from a third end to a fourth end defining a second inner channel. The sleeve is mounted on the housing so the field of view extends through the second channel, and the third end faces the second end. A transparent window between the housing and the sleeve is mounted to seal the first channel from the second channel. The sleeve has a passage extending therethrough in communication with the window, and the passage is configured so that a gas flow through the passage directs a stream of gas from the window towards the fourth end.

Another specific embodiment of the present invention provides a view of the atomization of liquid metal which comprises: an enclosure defining a chamber for containing a particulate formed from atomized liquid metal, and a nozzle for atomizing liquid metal mounted on the enclosure in communication with the chamber. The nozzle having a plenum means and a melt guide tube extending axially therethrough to an exit orifice. The plenum means having an orifice configured to provide a jet of atomizing gas converging in an atomizing zone extending from the exit orifice.

A viewing means comprised of an annular housing extends from a first end to a second end defining a first inner channel therein. The housing having a mounting means securing a camera in the first channel so the camera has a field of view extending from the second end. A sleeve extending from a third end to a fourth end defining a second inner channel, is mounted on the housing so the field of view extends through the second channel, and the third end faces the second end. A transparent window is mounted between the housing and the sleeve and seals the first channel from the second channel. The sleeve having a passage extending therethrough in communication with the window, the passage being configured so that a gas flow through the passage directs a stream of gas from the window towards the fourth end. A gas supply means extending through the enclosure to the passage. A flexible sleeve extending from the first end of the housing to the enclosure, and a cooling means extending through the flexible sleeve into the first channel to provide cooling for the camera. The viewing means being mounted on a bracket extending from the enclosure so the field of view extends through the atomization zone, and the viewing means has a preselect spacing from the atomization zone that provides for continuous viewing of the atomization.

An aspect of this invention is to provide an apparatus for remote viewing of a process in an environment that obscures the process.

Another aspect of this invention is to provide a method for viewing a molten metal atomization process.

Accordingly, an object of the present invention is to provide an apparatus and method for controlling industrial processes in an obscuring environment.

Another object of the present invention is to provide an apparatus and method for viewing the atomization zone during atomization of a molten metal.

BRIEF DESCRIPTION OF THE DRAWINGS

FIG. 1 is a schematic side view of an apparatus for atomizing molten metal;

FIGS. 2, 4, 6 and 8 are each a schematic side view of an apparatus for atomizing molten metal with the viewing apparatus positioned therein;

FIGS. 3 and 5 are each a schematic side view of an apparatus for viewing the atomizing of molten metal; and FIG. 7 is a graph showing the intensity of near infrared wavelengths that can be viewed during the atomization process from outside the atomization enclosure, compared to the intensity of near infrared wavelengths viewed by the method of this invention.

DESCRIPTION OF THE PREFERRED EMBODIMENTS

We have found that the atomized metal droplets formed by the close coupled atomization nozzle form a finite plume. In addition, we have discovered that an apparatus for providing a field of view extending to the atomization zone can be positioned adjacent the plume, without intruding into the plume As a result, the apparatus can provide a view of the atomization zone during the atomization process despite the recirculating particles or other obscuring debris present in the atomization enclosure.

One method of the present invention utilizes a viewing means which provides a field of view to the luminous emission of the molten metal stream and atomized droplets, so that the luminous plume in the atomization zone can be viewed, for example by a video camera or an infrared sensing radiometer. Furthermore, such optical path allows transmission of a substantial portion, at least about 70 percent, of the emitted visible to infrared light intensity so that images can be generated showing the interaction of the liquid metal and the atomizing gas that results in improved understanding and control of the atomization process.

The method, apparatus and system of the present invention is suitable for viewing processes such as welding, melting, casting, powder spraying or liquid metal atomization, which can produce smoke or other particulates that obscure the process. The apparatus and/or system is configured so that it can be remotely positioned to provide a viewing path sufficient to obtain meaningful data regarding the dynamic process being viewed. In addition, the apparatus or system can provide a purging gas flow or jet in the viewing path to remove smoke or other particles from the field of view of the viewing apparatus. For example, the apparatus or system of the present invention can be used to view the atomization of liquid metal to form powder.

Referring to FIG. 1, an illustrated example of the present invention includes an apparatus or system 2 for atomizing liquid metal. The apparatus 2 is comprised of a crucible 4, a nozzle 6, and an enclosure 8. The crucible 4 is formed of suitable material for holding the liquid metal, e.g. ceramic such as alumina or zirconia, or water cooled copper or other known suitable materials. A conventional heating means such as element 5 can be positioned for heating the molten metal therein. The molten metal in crucible 4 can be heated by any suitable means, such as an induction coil, plasma arc melting torch, or a resistance heating coil. The crucible 4 has a bottom pouring orifice coupled with a melt guide tube in nozzle 6. The crucible 4, and nozzle 6 are conventionally mounted on atomization enclosure 8.

The atomization enclosure 8, formed from a suitable material, such as, for example, steel is configured to provide an inner chamber 9 suitable for containing the atomization process. Depending upon the metal being atomized, enclosure 8 can contain an inert atmosphere or vacuum. A suitable crucible enclosure 10 can be formed over the crucible 4 to contain an inert atmosphere for the liquid metal. A conventional vacuum pump system, not shown, or gas supply means, not shown, are coupled with atomization enclosure 8 and crucible enclosure 10 to provide the inert atmosphere or vacuum therein. A conventional exhaust system, not shown, for example with cyclone separators, is coupled with enclosure 8 at connection 11 to remove the atomized powder during the atomization process.

A stream of luminous liquid metal from crucible 4 is atomized by the nozzle 6, forming a plume of luminous molten metal droplets 12 which are rapidly quenched to form solid particulates of the metal. Suitable nozzles are shown, for example, in U.S. Pat. Nos. 4,801,412, 4,780,130, 4,778,516, 4,631,013, and 4,619,845, incorporated herein by reference. The nozzle 6 directs a stream of liquid metal into a converging supersonic jet of atomizing gas. The high kinetic energy of the supersonic atomizing gas breaks up the stream of liquid metal into atomized droplets which are widely dispersed in the atomization enclosure. As a result, within several seconds of the initiation of atomization, the atomization vessel is filled with a cloud of recirculating powder particulates, for example shown by arrows 14.

While atomization of the liquid metal stream can be viewed at the initiation of atomization, for example from view port 16 mounted on atomization enclosure 8, the interaction between the atomizing gas jet and the liquid metal stream is obscured by the cloud of metal particulates within a few seconds.

The apparatus, system and method of the present invention provides a field of view to the atomization zone, so the view along that path is not so obscured by the recirculating powder particles 14 that the ability to obtain meaningful data about the atomization zone is not lost. One apparatus and method of the present invention, and a brief description of a field of view, is shown by referring to FIG. 2.

An apparatus 31 for viewing the atomization process is comprised of an enclosure 32, a nozzle 34 for atomizing liquid metal, and a field of view extending through the viewing apparatus 31 through the enclosure to the nozzle 34. The enclosure 32 is configured to define an inner chamber 33 suitable for containing the atomization process. The nozzle 34 for atomizing liquid metal is mounted on the enclosure 32 in communication with chamber 33.

Briefly described, one suitable nozzle is comprised of a cylindrical plenum 34a and a melt guide tube 34b extending axially therethrough to a melt exit orifice 34c. A stream of liquid metal is directed through the melt guide tube 34b. The melt guide tube 34b extends from a bottom pouring orifice in the crucible 52 to the atomization zone 37.

The plenum 34a defines an inner chamber 35 coupled with an annular atomizing gas orifice 35a spaced from the melt exit orifice 34c and configured to provide a jet of atomizing gas converging in an atomizing zone 37 extending from the melt exit orifice 34c. The plenum 34a can also be formed to define an inner chamber coupled with an array of discrete atomizing gas orifices spaced from the exit orifice. The array of discrete gas orifices are configured to provide an gas jet comprised of an array of discrete gas jets converging in the atomizing zone. A gas inlet, not shown, extends through the plenum means in communication with the inner chamber 35. The gas inlet is coupled with a conventional gas supply means to provide the atomizing gas, such as argon, to the inner chamber, as is well known.

The atomization zone 37 is believed to extend from the exit orifice 34c at the tip of the melt guide tube 34b, for example, for a distance of up to about 20 melt exit orifice diameters. The atomization zone 37 typically includes a first section 37a where the luminous stream of liquid metal exits from the melt exit orifice 34c, and a second section or plume 37b, where the liquid metal stream interacts with the gas jet emitted from the atomization gas orifice 35a, which causes the metal to stream break up or atomize. The atomization zone 37 is characterized by a high kinetic energy from the atomization gas jet, which can be at supersonic speeds, and the plume 37b of atomized liquid metal droplets.

The field of view 47 extends through the viewing apparatus 31 positioned in the atomization enclosure 32 to a viewing orifice 46 adjacent the atomization zone 37. The viewing orifice 46 should not extend into the atomization zone 37, i.e. the plume 37b of atomized droplets and supersonic atomizing gas jet. For example, in the atomizing apparatus 30 shown in FIG. 2 it was found that the viewing orifice 46 could extend to about 15 degrees from the vertical axis 37c of the atomized plume 37b, and about 20 millimeters from the vertical axis 37c of the atomized plume 37b. Preferably, the viewing orifice 46 is positioned about 30 to 60 degrees, and about 20 to 50 millimeters from the vertical axis 37c of the atomized plume.

The viewing apparatus 31 is configured to extend through the chamber to provide a protected field of view for the viewing apparatus which extends to the atomization zone 37. The viewing apparatus 31 includes a window means having a hermetic seal and including for maintaining the vacuum or protective atmosphere within the enclosure 32. The illustrative viewing apparatus 31 comprises a cylindrical first sleeve 38, a transparent window 42, and a second sleeve 44. The first sleeve 38 extends through the enclosure 32 to a first end 40 within the chamber 33. The window 42 is operatively mounted by conventional means such as conventional fasteners and a gasket to hermetically seal the first end 40. The window 42 is formed from a transparent material such as silica glass, Lucalox polycrystalline alumina, polycrystalline yttria, for example shown in U.S. Pat. No. 4,755,492, and single crystal alumina or zirconia or other apparatus materials.

The second sleeve 44 is mounted on the first end 40, and extends therefrom to the viewing orifice 46 which is spaced from the atomization zone 37. Preferably, the second sleeve 44 is configured to have a conical shape narrowing at the viewing orifice 46. The second sleeve 44 can be formed from a suitable metal sheet, such as steel or nickel alloy, that is rolled and spot welded to form the cylindrical or conical shape or by other conventional means and of other appropriate material. Preferably, the second sleeve 44 extends at least about 30 centimeters from the window 42 so that recirculating particles 14 (see FIG. 1) entering the viewing orifice 46 fall to the bottom of the second sleeve 44 before hitting the window 42. The second sleeve 44 is mounted on first end 40, for example, by extending the second sleeve around sleeve 38 and securing thereto with a conventional fastener such as a clamp, adhesive, welding, metal to metal bonding or other appropriate means.

The viewing orifice 46 is of a sufficient size to provide a view of the atomization zone 37 from within the first sleeve 38, for example about 10 to 40 millimeters in diameter. A sensor 50, such as, for example, a camera or other sensor can be mounted on the enclosure 32, or within the first sleeve 38, so that the field of view 47 of the sensor 50 extends through the window 42. The sleeve 38 and second sleeve 44 being positioned to extend through enclosure 32 so that the field of view 47 of sensor 50 extends at least to the atomization zone 37 and possibly through the atomization zone.

Preferably, the first sleeve 38 comprises a first section extending from the enclosure, and a second section extending to the first end 40. The second section extends into the first section to provide for axial adjustment of the position of the first end. A conventional flange having a gasket is conventionally mounted, for example with mating threads, to provide a hermetic seal in the first sleeve.

Figure 2:
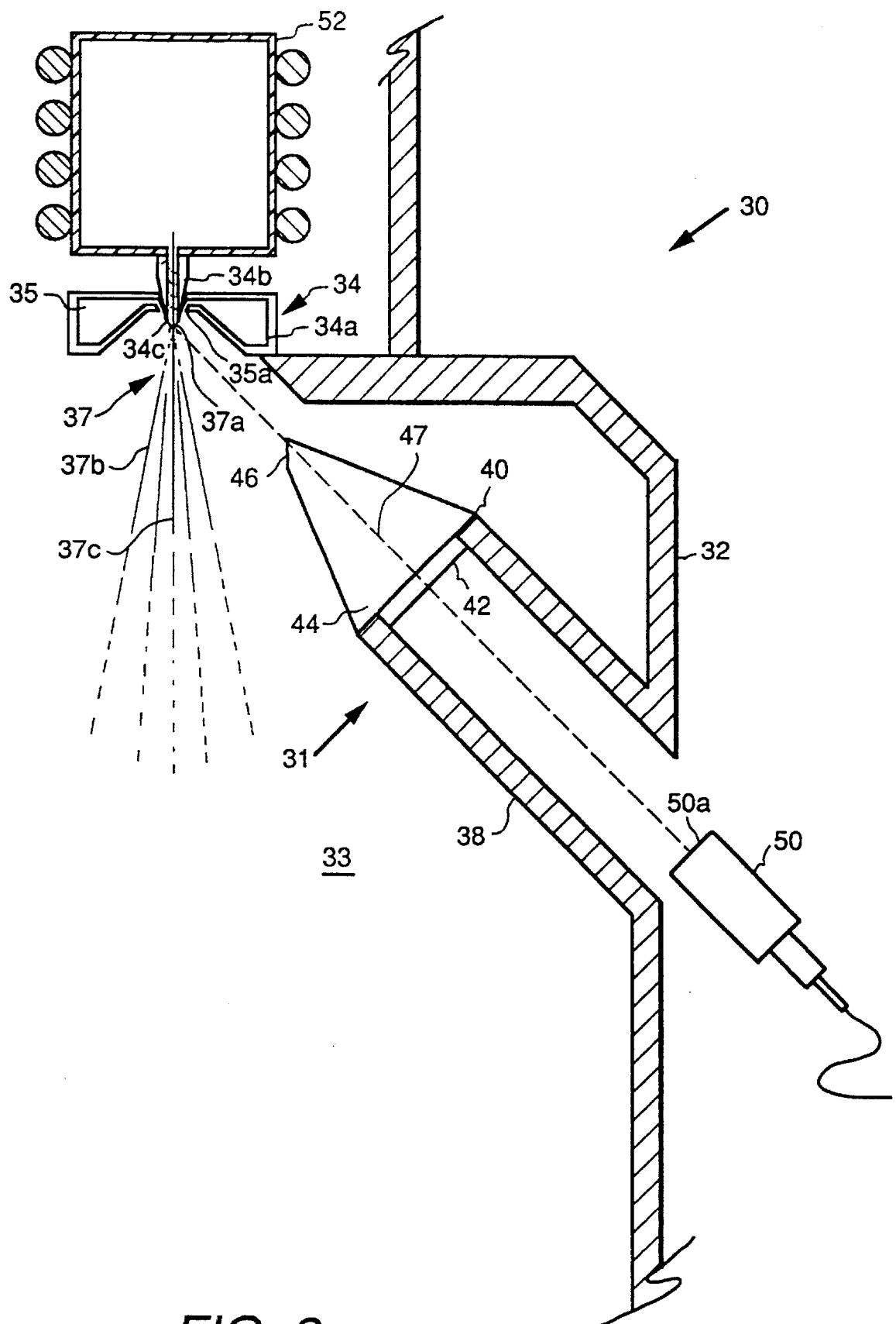

Recirculating powder particles 14 (see FIG. 1) can enter the viewing orifice 46. A gas purge means, not shown in FIG. 2, is mounted in the second sleeve to sweep the recirculating powder particles from the transparent window, and out of the second sleeve. A suitable gas purge means can be formed by extending a tube into the second sleeve 44. The tube is operatively coupled with a conventional gas supply means, and the tube is positioned in the second sleeve to direct a flow of inert gas inert across window 42 to sweep the particulate therefrom. It was found that a gas, such as argon have a flow rate of about 1.5 Kg/min. from the tube was suitable to keep the window 42 clean. Preferably, the second sleeve 44 is formed with a bore (not shown) sufficient to allow the purging gas and particles to pass therefrom.

The sensor 50 can be any conventional photographic or video camera. In addition, the sensor may be an imaging pyrometer, for example shown in U.S. Pat. Nos. 4,687,344, or 4,656,331 to provide a thermal plot or temperature profile of the atomization zone with an associated visual image. Preferred commercially available sensors and specifically cameras are miniature CCD based S-VHS or VHS cameras incorporating high speed electronic shutters. Examples of such commercially available cameras are the Toshiba IKM-30A, M-40A, and IKM-M30MA, and the Sony XC-77RRCE and SC-RRCE. Such cameras can have a diameter of 3 centimeters or less, and a length of about 2 to 3 centimeters or less complete with the associated lensing. As a result, the camera can be positioned in a small space, such as the first sleeve 38. Conventional lensing for the camera 50 can be positioned at a front end 50a of the camera, or the transparent window 42 can be formed as the lensing for the camera. Suitable conventional lenses, known as microminiature lenses, are, for example, Toshiba models JK-L04, JK-L7.5, JK-L15, and JK-L24.

The output signal from the camera, such as the standard EIA RS-170 composite signal (525 line, 60 Hz, 2/1 interlace), can be sent to a signal processor, not shown. At the signal processor the signal can be split and sent to a conventional video recorder and television display as well as being digitized and sent to a computer control.

Figure 3:
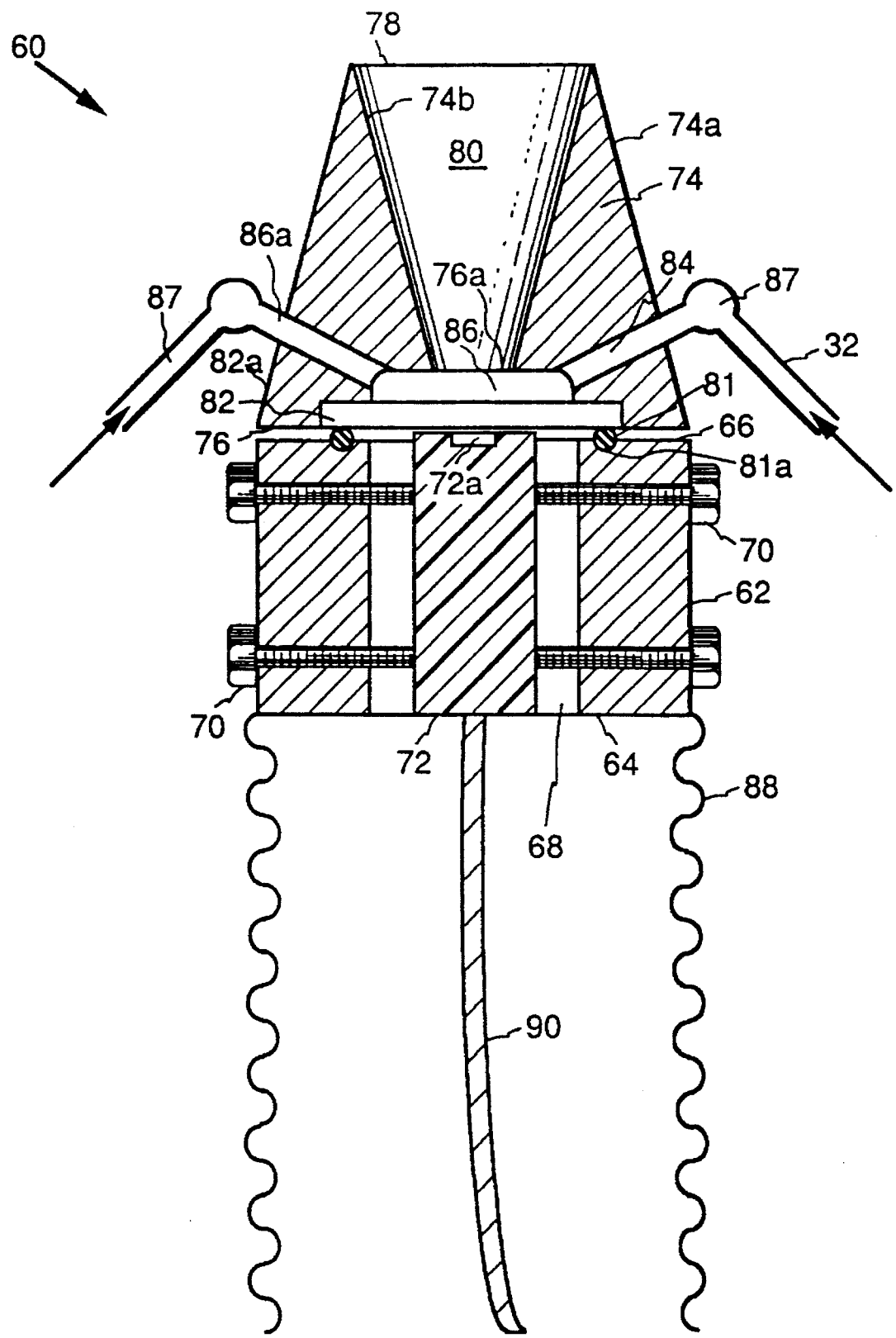

Another embodiment of the viewing apparatus used in the method of this invention is shown by referring to FIG. 3. The apparatus 60 comprises a housing 62 extending from a first end 64 to a second end 66 defining an inner channel 68. The housing 62 can be formed from a suitable structural material such as stainless steel, nickel alloys, or like materials.

The housing 62 is formed with a mounting means suitable for positioning a sensor 72 within the inner channel 68. For example, the mounting means can be comprised of oppositely facing conventional fasteners 70 extending through mating threaded bores in housing 62. The sensor 72 is secured in channel 68 by the fasteners 70, the sensor being positioned to have a field of view extending from the second end 66. The fasteners 70 can be coated with a conventional sealant, such as Teflon synthetic resin polymer, before insertion into the mating threaded bores to provide a hermetic seal.

A sleeve 74, formed from a sufficiently wear resistant material such as stainless steel, nickel alloys, or like materials, extends from a third end 76 to a fourth end 78 defining a second inner channel 80. The sleeve 74 is operatively connected to the housing 62 so that the third end 76 faces the second end 66 and the field of view of sensor 72 extends through second channel 80. A transparent window 82, formed of the wear resistant transparent material disclosed above is positioned between the housing 62 and the sleeve 74, and mounted to seal the first channel 68 from the second channel 80. For example, the window 82 is positioned in a mating recess 82a in the third end 76. Sealing means, such as, for example, rubber o-ring 81, are positioned in mating cavity 81a in housing 62. Conventional fasteners, not shown, extend through bores in sleeve 74 into mating threaded bores in housing 62. The fasteners are secured to urge sleeve 74 toward window 82, in turn urging window 82 toward o-ring 81 forming the seal. Conventional lensing for the sensor 72 can be positioned at a front end 72a of the sensor, or the transparent window 82 can be formed as the lensing for the sensor.

The sleeve 74 is formed with a passage 84 extending through the sleeve in communication with the window 82. For example, a cylindrical channel 86 facing the window 82 is formed in the third end 76 of the sleeve 74. At least one gas inlet channel 86a and preferably more extend from the channel 86 through sleeve 74. A tube or tubes 87 are mounted to extend into gas inlet channel(s) 86a and are operatively coupled to a conventional gas supply means not shown. The passage 84 is configured so that a gas flow passing from tubes 84 into passage 86 directs a stream or jet of gas from the window 82 towards the fourth end 78 of sleeve 74.

Preferably, the second channel 80 has a conical shape narrowing at a end 76a facing the window 82. Preferably, the second channel 80 has an included angle of about 10 to about 40 degrees. In other words, if the frustrum of the conical channel is extended to form a cone, the apex angle of the cone can range from about 10 to about 40 degrees. Included angles of greater than about 30 to about 40 degrees, can exceed the maximum expansion angle of the gas jet passing through the conical channel 80. When the maximum expansion angle of the gas jet is exceeded, recirculating gas currents can form in the channel that draw particles towards the window 82.

In this way, the gas pressure in the conical channel 80 is greatest at the narrow end 76a, and decreases towards the wider end 78. Atomized particles entering channel 80 meet greater and greater resistance as the particles proceed further into the channel 80 toward narrow end 76a. The gas flow or jet through channel 80, protects the transparent window 82 from atomized particles depositing on, scratching, or otherwise damaging the window.

Preferably, the narrow end 76a has a diameter of about 0.6 to about 5 millimeters. When the narrow end 76a is less than about 0.6 millimeters in diameter, insufficient light is admitted for a sensor 72, such as a camera, to be able to ascertain sufficient information about the atomization zone. When the narrow end 76a is greater than about 5 millimeters in diameter, the gas jet from the conical channel 80 can become massive enough to disturb the atomization process (see FIG. 1).

When the ratio of the gas pressure $P^*$ in the passage 84 to the ambient pressure P is greater than about 2 to about 3, a supersonic gas jet can form in the second channel 80. It is well known that the index of refraction along an optical path or the field of view extending through the second channel 80, can change due to variations in gas density. Such changes in the index of refraction can optically distort the light entering a sensor 72, such as a camera, in the housing 62. As a result, the amount of distortion can increase with increased gas density and density gradients, for example produced in a supersonic gas jet. It is believed distortion will be minimal in subsonic gas jets, while distortion can increase above supersonic velocities.

Preferably, the purging gas, such as argon, is supplied to the passage 84 at a pressure sufficient to provide purging gas velocities in the second channel 80 that prevent particles from damaging the window, and provide a clear field of view. However, some distortion in the image provided by the camera 72 could be observed as the gas pressure to passage 84 is increased, and the purging flow in the second channel exceeded the sonic velocities. When the gas flow remains attached to the sidewalls of the second channel, for example in conical channels having an included angle of about 10 to about 40 degrees, the gas density gradients in the second channel 80 are minimized. Therefore, the conical channel 80 in the sleeve 74 is preferred when higher gas velocities, e.g., sonic velocities are required.

A suitable purging gas velocity will depend upon the particular atomization process. For example, a suitable purging gas velocity can be determined by increasing the pressure supplied through passage 84 to an upper pressure limit where the image from the camera becomes distorted. The atomization process is activated to atomize a molten metal, and the pressure supplied to passage 84 is reduced to a lower pressure limit where recirculating powder is visible in the image from the camera. The purging gas is provided to the passage 84 at a pressure between the upper and lower pressure limits.

Preferably, the sleeve 74 has an inner surface 74b, defining conical channel 80, that converges with the outer surface of the sleeve at the fourth end to form an edge. More preferably, the sleeve 74 has an outer surface 74a having a conical shape narrowing at the fourth end 78. The oppositely converging conical shapes of the inner surface 74b and the outer surface 74a of sleeve 74 meet at the fourth end 78. As a result, molten or plastic particles impinging upon the fourth end 78 are more easily diverted or deflected therefrom, minimizing the buildup of deposits on the fourth end that could reduce the field of view extending from the second channel 80. In addition, the conical shape of the outer surface 74b allows the field of view from the viewing means 60 to be positioned closer to the atomization plume 37b (see FIG. 2).

Temperature in the atomization enclosure can reach about 400° C., and the camera cord 90 must be protected from the high temperatures and recirculating particles. A flexible sleeve 88 extends from the first end 64 to the enclosure to protect the camera cord 90. A cooling means, not shown, extends through the flexible sleeve 88 into the inner channel 68 in the housing 62 and provides suitable cooling for the camera 72 and the cord 90. For example, a tube coupled to a conventional gas supply means extends through the flexible sleeve 88 into the inner channel 68. A flow of gas from the tube cools the camera 72 and flows from the inner channel 68 through the flexible sleeve 88 cooling the cord 90.

Figure 4:
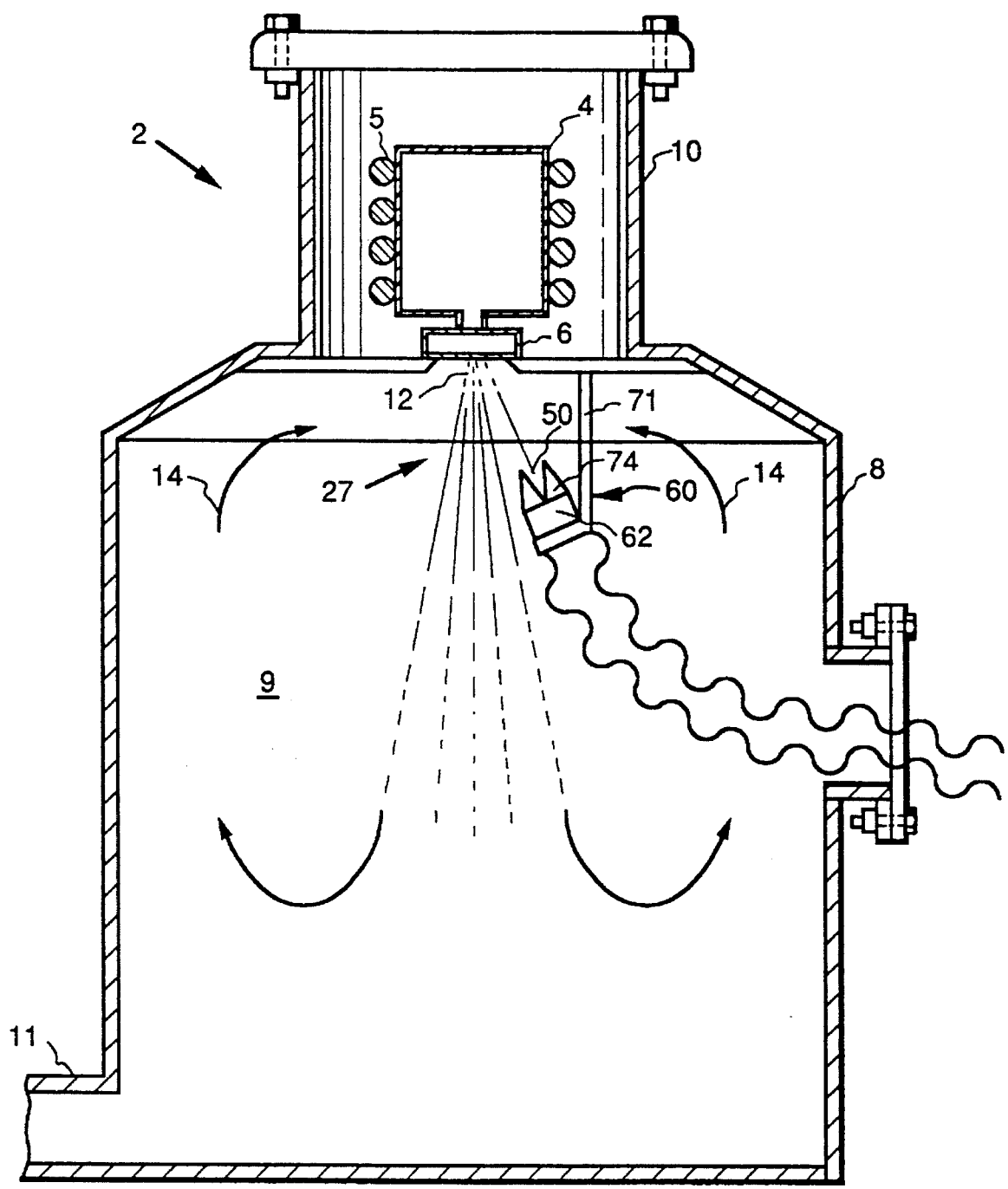

As shown schematically in FIG. 4 and with more detail in FIG. 3, the viewing apparatus 60 can be mounted on a bracket 71 in the atomizing enclosure 8 so that the sleeve 74 is spaced from the atomizing zone, and the field of view from the camera within housing 62 extends through the atomizing zone 27. The gas supply means coupled to passage 84 (FIG. 3) provides a gas pressure to produce a purging gas flow or jet passing from the window out of the second channel 80. Recirculating powder particles 14 from the atomization process are swept from the second channel 80 by the purging gas stream or jet. As a result, particles impinging upon the second channel 80 are prevented from contacting or damaging the transparent window 82.

Figure 5:
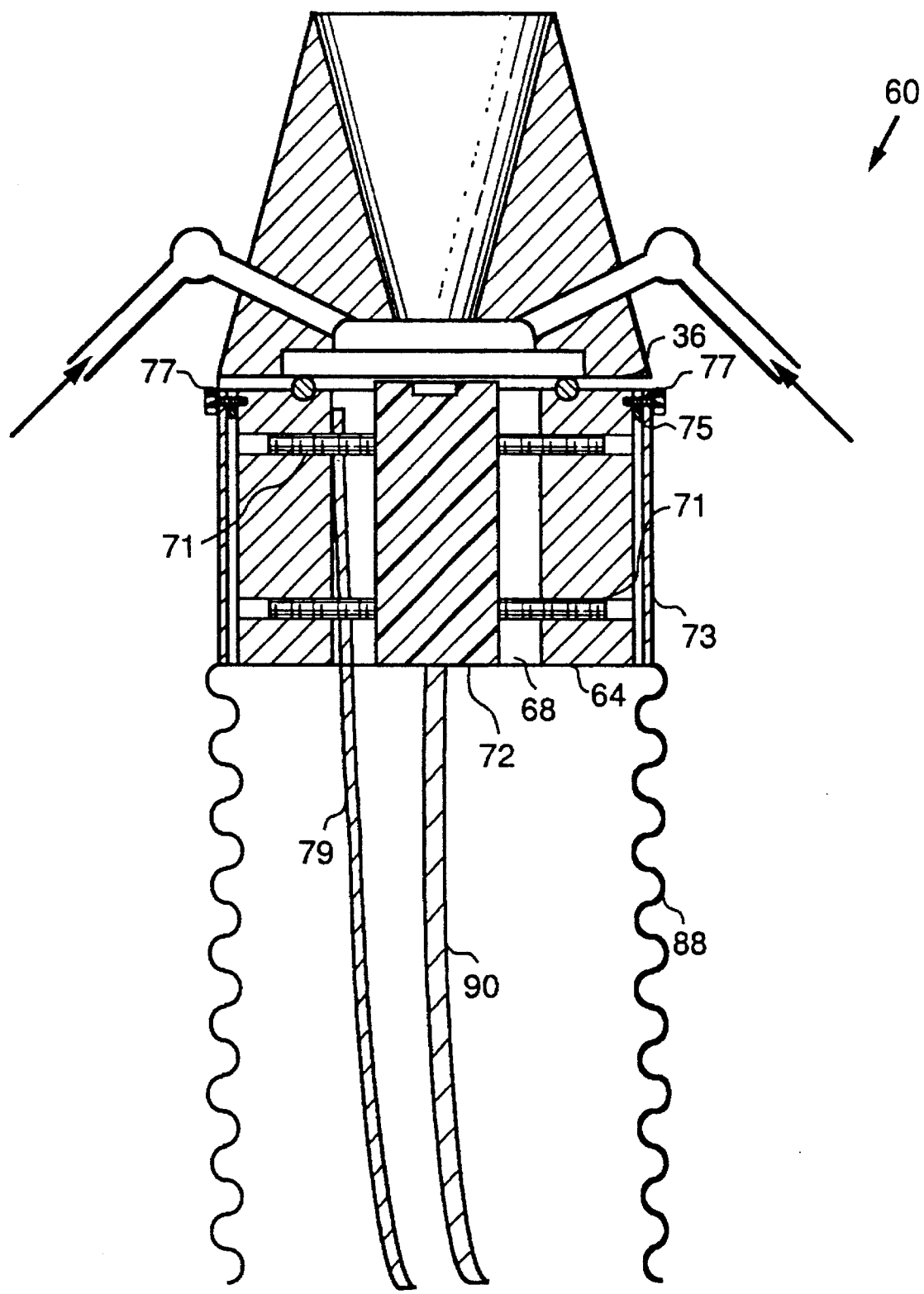

In another embodiment, as shown in FIG. 5, the viewing apparatus is used in a vacuum, for example, in the atomization enclosure. As a result, the viewing apparatus is configured with a vacuum tight housing 64 to prevent the atmosphere within the housing, for example to cool the camera 72, from leaking into the atomization enclosure. The viewing apparatus shown in FIG. 3 can be modified as follows to form the vacuum tight housing. Conventional set screws 71 can be recessed in the mating threaded bores in the housing 64. An annular outer housing 73 is positioned over the housing 64 with an o-ring seal 75 therebetween.

Conventional fasteners 77 extend through the outer housing 73 into mating bores in the second end of housing 64 to fix the position of the outer housing thereon. The o-ring seal 75 is positioned between the recessed fasteners 79 and the fasteners 77 to form a hermetic seal therebetween. The fasteners 77 are spaced from the o-ring seal 75 so they do not affect the hermetic seal. The flexible sleeve 88 is sealably attached, for example by welding or other appropriate means, to the outer housing 73, and extends therefrom to protect camera cord 90. The cooling means, e.g. tube 79, extends through flexible sleeve 88 into the inner channel 68 of the housing 64. The tube 79 is operatively coupled to a conventional gas supply to provide a cooling gas such as argon. A flow of the gas from the tube 79 cools camera 72 and flows from inner channel 68 through flexible sleeve 88 cooling the camera cord 90. The outer housing 71, o-ring 75, and flexible sleeve 88 provide a hermetic seal that prevents the cooling gas within the viewing apparatus from leaking into the vacuum in the atomization enclosure.

Figure 6:
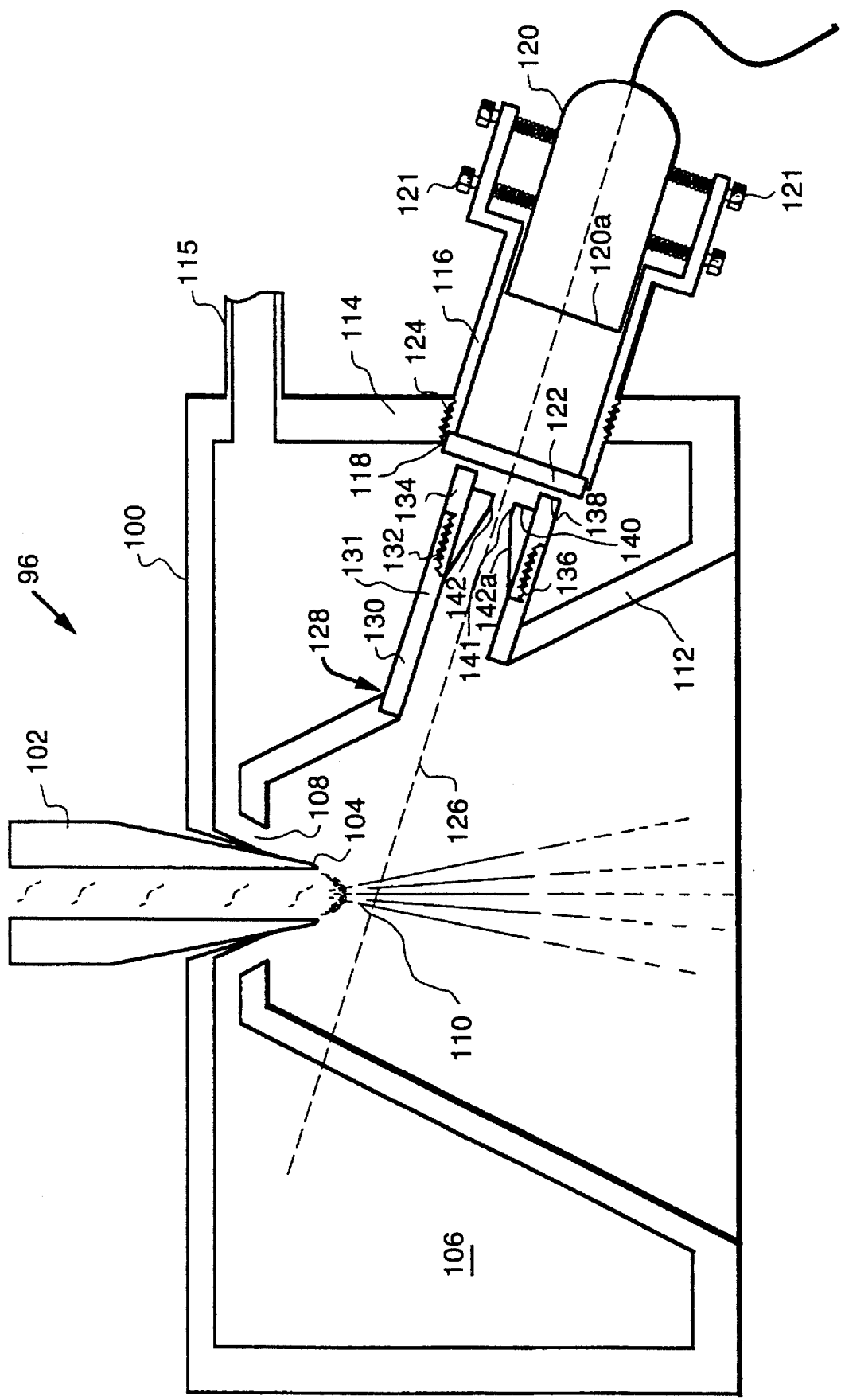

Another embodiment of the viewing apparatus as used in one system and method of the present invention is shown by making reference to FIG. 6. The nozzle 96 is comprised of a plenum 100, and a melt guide tube 102 extending axially therethrough to a melt exit orifice 104. The melt delivery tube 102 extends from the bottom pouring orifice in the crucible, not shown. The plenum 100 defines an inner chamber 106 coupled with an annular atomizing gas orifice 108 spaced from the exit orifice 104 and configured to provide a jet of atomizing gas converging in an atomizing zone 110 extending from the exit orifice 104. The plenum 100 is configured with an inner sidewall 112 extending below the exit orifice 104 and spaced from the atomizing zone 110. The inner sidewall 112 extends to a cylindrical outer sidewall 114. The inner sidewall 112 can be adjustably mounted on the outer sidewall 114, for example, by providing mating threaded surfaces (not shown) where the inner sidewall meets the outer sidewall. A gas inlet tube 115 extends through the outer sidewall 114, and is coupled with a conventional gas supply means, not shown, to provide a predetermined atomizing gas pressure in inner chamber 106.

The viewing apparatus comprises a sleeve 116 extending through the outer sidewall 114 to a first end 118 in communication with the plenum inner chamber 106. A camera 120 or other sensor is mounted by conventional fasteners 121 in the sleeve to have a field of view extending from the first end 118. Preferably, the camera is mounted in the sleeve with a low thermal conductivity insulating material, such as nylon, therebetween. For example, the fasteners 121 can be formed from the insulating material. The sleeve 116 is positioned so that the field of view of the camera 120 can extend through the atomization zone 110. Preferably, the sleeve 116 has a threaded exterior surface mating with a threaded bore 124 in outer sidewall 114.

A transparent window 122 is mounted to seal the first end 118 of the sleeve 116. The window 122 is formed from the transparent materials described above. Conventional lensing for the camera 120 can be positioned at a front end 120a of the camera, or the transparent window 122 can be formed as the lensing for the camera.

A porthole means 128 is formed in the plenum inner wall 112 along the field of view 126 of camera 120 to provide a view of the atomization zone. For example, the porthole means 108 can be formed as a bore, not shown, in the inner sidewall 112 along the field of view of camera 120 to provide a view of the atomization zone 110 for the camera 120. Atomizing gas at a high pressure in chamber 106 flows from the porthole means 128, and interacts with recirculating powder particles that can enter and be directed down the porthole means. The flow or jet of gas emitted from the porthole means blows the powder particles back out of the porthole means before the powder can reach the transparent window 122. The flow or jet of gas from the porthole means prevents powder from contaminating, e.g., pitting, scratching, or depositing on the transparent window 122.

The bore is at least large enough to admit sufficient light to the camera 120 or other appropriate sensor so that an image of the atomization zone can be generated. However, the bore is restricted in size so that the purging gas jet issuing therefrom does not substantially disturb the atomization process. For example, a suitable size for the bore in the inner sidewall 112 was found to be about 0.25 to 4 about millimeters.

The porthole means 128 can extend through the inner wall 112 along the field of view of camera 120 to provide a view of the atomization zone 110 through the inner wall 112. For example, the porthole means 128 can be comprised of a first sleeve 130 extending through the inner wall 112 to a second end 138 spaced from the transparent window 122. A disk 140 having an axial bore 142 is mounted in the first sleeve 130. The bore 142 is sufficient to provide a view of the atomization zone 110 to camera 120. For example, the bore 142 can have a diameter of about 0.25 to about 13 millimeters. In addition, the high pressure atomizing gas within the chamber 106 flows through the bore 142 to provide a purging gas jet flowing out of the porthole means 128 toward the atomization zone 110. The purging gas jet minimizes the intrusion of atomized particles into the chamber 106, and prevents contact or deposit of the particles on the window 122.

The gap between the second end 138 of the first sleeve 130, and the first end 118, or window 122, can be selectively adjusted, because the threaded outer surface of sleeve 116 provides for axial positioning of the sleeve. For example, a preselect gap can be chosen to restrict the gas flow through the first sleeve 130 and the bore 142. As a result, larger bores can be formed, for example, the bore 142 can have a diameter of about 0.25 to 13 millimeters. Preferably, when the bore 142 is greater than about 4 millimeters, the gap between the second end 138 and the window 122,is selectively adjusted to provide a gas flow through the bore 142 that does not substantially disturb or interfere with the atomization process.

Preferably, the first sleeve 130 is comprised of a first section 131 extending to a first threaded end 132. A second section 134 having a second threaded end 136 mating with the first threaded end 132 extends to the second end 138 spaced from the transparent window 122. The disk means 140 mounted in the second section 134 of the sleeve 130 is preferably formed with a frustrum shaped axial bore 142*a* having a narrow end 141 facing the window 122. Preferably, the frustrum shaped bore 142*a* has an included angle of about 10 to about 40 degrees. In other words, if the frustrum is extended to form a cone, the apex angle of the cone can range from about 10 to about 40 degrees. Included angles of greater than about 30 to about 40 degrees, can exceed the maximum expansion angle of the gas jet passing through the frustrum shaped bore. When the maximum expansion angle of the gas jet is exceeded, recirculating gas currents can form in the bore that draw the recirculating particles toward the window 122.

In this way, the gas pressure in the frustrum shaped bore 142*a* is greatest at the narrow end 141 and decreases towards the wider end 141*a*. Atomized particles entering the frustrum shaped bore 142*a* meet greater and greater resistance as the particles proceed toward the narrow end 141. The gas flow or jet through the frustrum shaped bore, protects the transparent window 122 from atomized particles depositing on, scratching, or otherwise damaging the window. The narrow end 141 of the frustrum shaped bore 142*a* can have a diameter of about 0.25 to about 13 millimeters. When the narrow end 141 is less than about 0.25 millimeters in diameter, insufficient light is admitted for the camera 120. When the narrow end 141 is greater than about 2 millimeters in diameter, the gas jet from the frustrum shaped bore can become massive enough to disturb the atomization process in the atomization zone 110.

The mating threaded ends of first section 130 and second section 134 provide for axial adjustment and extension of second end 138 into chamber 106. Similarly, the threaded exterior of sleeve 116 mating with threaded bore 124 in the outer sidewall 114 provides for axial adjustment of the sleeve to provide for adjustment of the gap between transparent window 122, and third end 138. As a result, a preselect spacing or gap between second end 138 and transparent window 122 can be selected to provide a flow of gas from within the inner chamber 106 through the bore 142*a* and out of sleeve 130 that minimizes the passage of atomized particles through the porthole means, and depositing on or scratching transparent window 122. The gap can also be selectively adjusted to provide a gas flow that does not substantially disturb the atomization process.

For example, when the narrow end 141 of the frustrum shaped bore, is closer to the minimum diameter, preferably, the preselect spacing is about twice the area of narrow end 141. However, when the narrow end 141 of the frustrum shaped bore, is closer to the maximum diameter, preferably, the preselect spacing is selected to control the gas flow through the bore so that the purging gas jet does not substantially disturb the atomization process.

Additional control over the purging gas jet issuing from the porthole 128 can be achieved by forming the plenum means to define two separate inner chambers. A first inner chamber in communication with the atomizing gas orifice, and a second inner chamber in communication with the porthole means. A first gas inlet extends through the plenum means in communication with the first chamber, and a second gas inlet extends through the plenum means in communication with the second chamber. The first and second gas inlet each being operatively coupled to a conventional gas supply means to provide the atomizing gas and purging gas, respectively.

The discussion relating to when the ratio of the gas pressure P* in the second inner chamber to the ambient pressure P is greater than about 2 to about 3 a supersonic gas jet is formed in the bore on page 17 is also applicable to this embodiment, but, for sake of brevity, will not be repeated here.

EXAMPLE

A steel or nickel based alloy molten metal stream and the atomized metal plume emitted from the atomization nozzle are luminescent, and the intensity of near infrared light from the luminous stream and atomized metal plume can be measured by a two dimensional imaging pyrometer, for example shown in the U.S. Pat. Nos. 4,687,344, and 4,656, 331, incorporated herein by reference. The intensity of visible light from the atomization process was measured through a conventional porthole, such as shown in FIG. 1, and by the method of this invention. Referring to FIG. 1, the imaging pyrometer was mounted on the enclosure 8 to have a field of view extending through the viewing port 16 and the atomization zone. Referring to FIG. 2, the imaging pyrometer was also mounted on enclosure 32 to have a field of view extending through the optical path 31, and window 42 to the atomization zone 37. The crucible was filled with a molten nickel alloy, and bottom poured through the nozzle to form an atomized plume.

Figure 7:
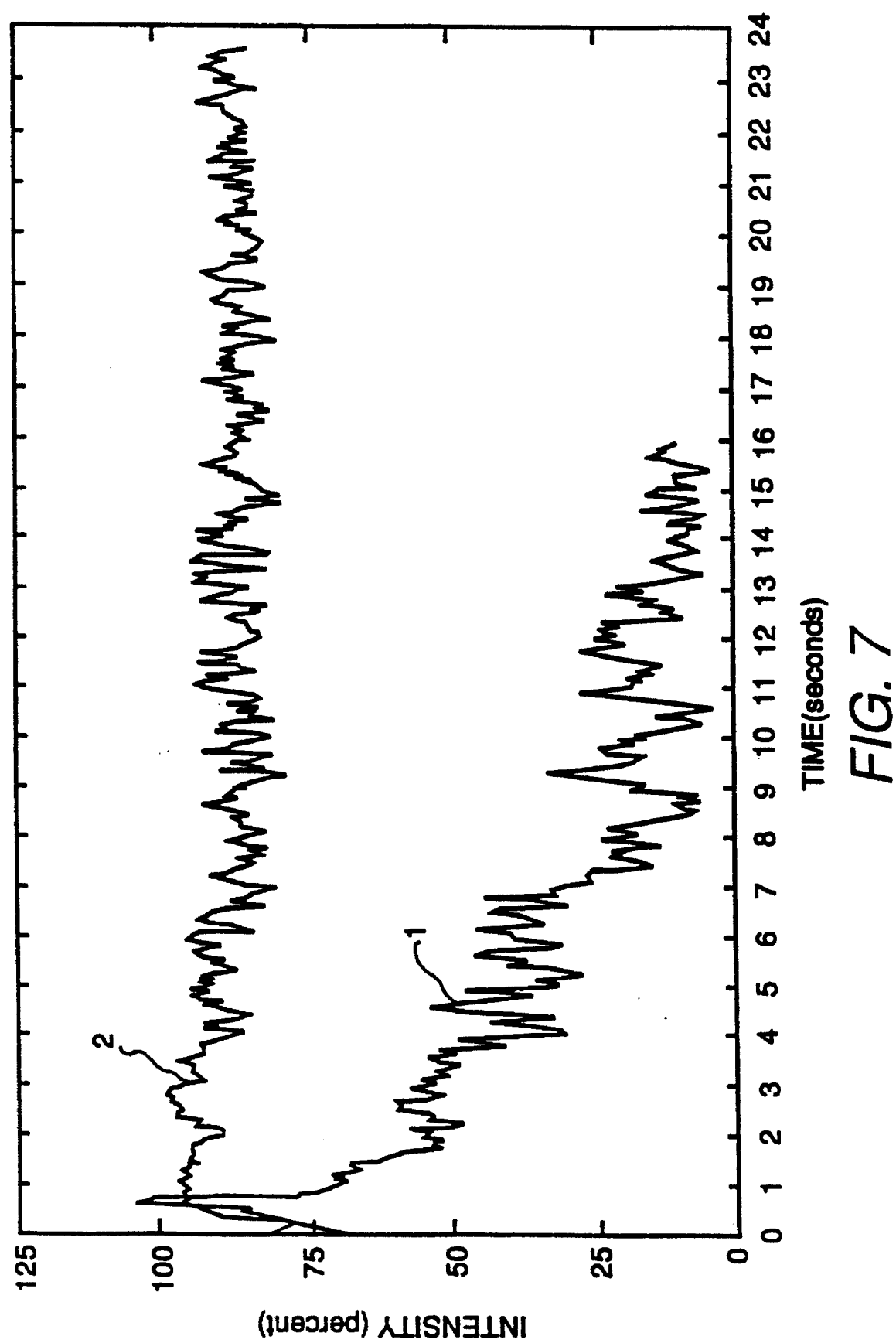

FIG. 7 is a graph showing the measured intensity of near infrared light, having a wavelength of about 0.8 to 1.1 micron, received from a preselect region in the atomization zone. Line number 1 in FIG. 5 is the measured intensity through the viewing port, and shows that the intensity of near infrared light from the atomization zone is reduced by about 50 percent within about 3 seconds due to the recirculating powder particles formed during the atomization process. The intensity of near infrared light continued to decrease, and was reduced by about 80 percent within about 10 seconds of the beginning of atomization. As a result, the atomization process is substantially obscured to the point where information about the atomization process cannot be viewed. In contrast, line 2 in FIG. 7 shows that the apparatus of this invention provides a view of the atomization process wherein the intensity of near infrared light is reduced by less than about 5 to about 10 percent during the atomization process so that useful information about the process can be viewed during the entire process.

Figure 8:
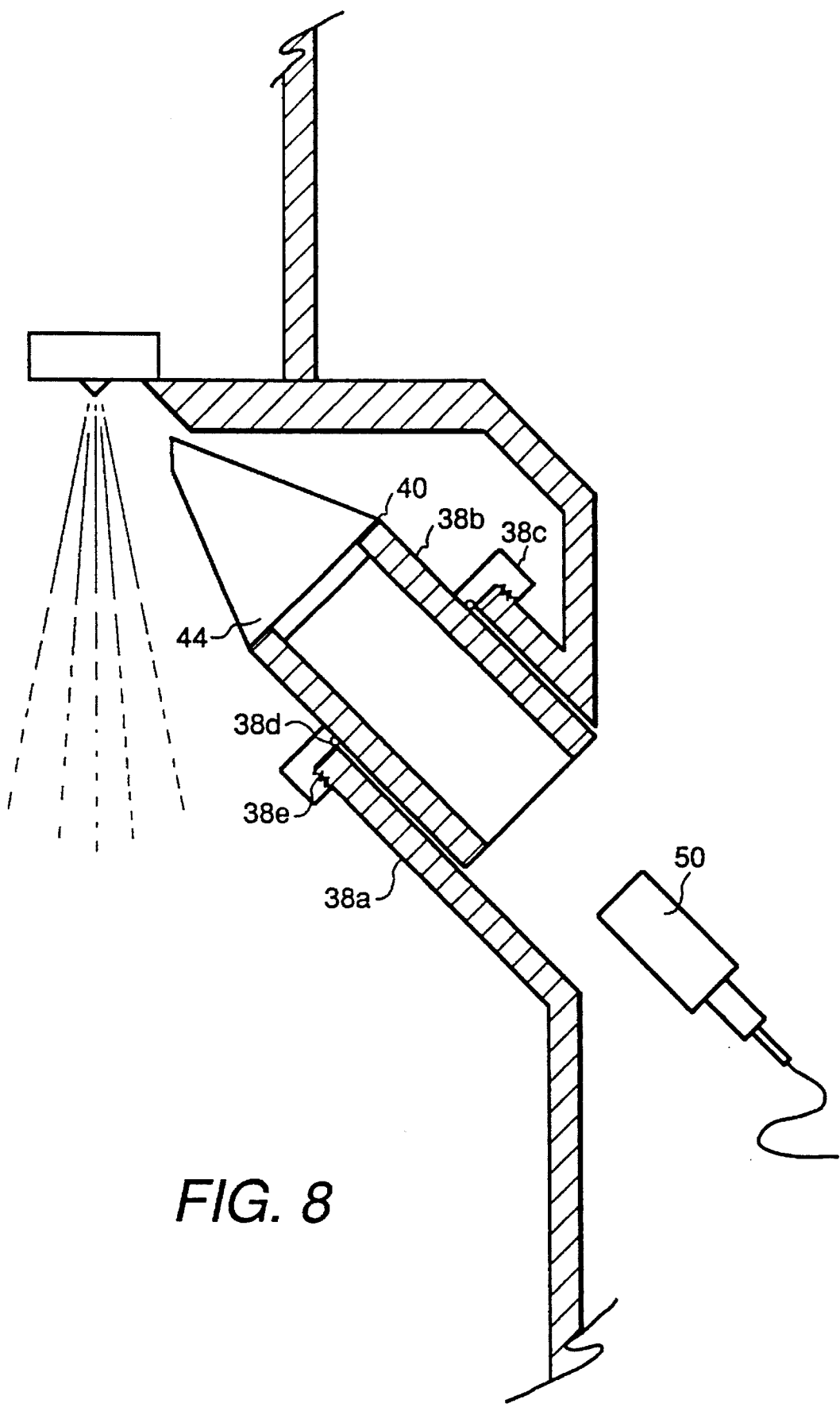

Referring now to FIG. 8, preferably, the first sleeve comprises a first section 38a extending from the enclosure, and a second section 38b extending to the first end 40. The second section 38b extends into the first section 38a to provide for axial adjustment of the position of the first end 40. A conventional flange 38c having a gasket 38d is conventionally mounted, for example with mating threads 38e, to provide a hermetic seal.

The imaging pyrometer was also mounted on enclosure 32 to have a field of view extending through the viewing means 31 to the atomization zone. The crucible was filled with a molten nickel alloy, and bottom poured through the nozzle to form an atomized plume.

While the method, apparatus and system herein described constitute preferred embodiments of the invention, it is to be understood that the invention is not limited to these precise methods, apparatus and systems and that changes may be made therein without departing from the scope of the invention which is defined in the appended claims.

What is claimed is:

1. A system for providing continuous monitoring of an atomization zone containing a luminous material during a process close coupled atomization of liquid metal in an enclosure, the system comprising:

a crucible;

a melt guide tube, operatively connected to the crucible, for providing a stream of liquid metal to the atomization zone;

a plenum, operatively connected to the nozzle and operatively positioned relative the melt guide tube for providing atomizing gas to the atomization zone; and monitoring means, operatively positioned in the enclosure proximate the atomization zone, for monitoring the atomization zone such that during the atomization process, the intensity of near infrared light of luminous liquid metal droplets admitted into the monitoring means is sufficient to provide images of the atomization process for a period longer than about 10 second after commencement of the atomization process.

2. The system of claim 1, wherein the monitoring means further comprises:

a first member having two open ends operatively connected to the enclosure;

a second member having two open ends operatively connected to the first member and extending into the enclosure proximate the atomization zone; and a transparent window, operatively positioned between the first and second members, for sealing the first member from the second member.

3. The system of claim 2, wherein the second member has a conical shape narrowing at the end most proximate the atomization zone.

4. The system of claim 2, wherein the second member has sufficient length so that the circulating particles entering the end most proximate the atomization zone are prevented from hitting the window.

5. The system of claim 2, wherein the open end of the second member most proximate the atomization zone has a diameter of about 10 to about 40 millimeters.

6. The system of claim 2, wherein the monitoring means further comprises:

a sensor operatively positioned within the first member.

7. The system of claim 5, wherein the sensor is a camera.

8. The system of claim 2, wherein the second member further comprises:

particle purging means, operatively positioned relative to the window, for sweeping particles from the proximity of the window and out the open end of the second member most proximate the atomization zone.

9. The system of claim 8, wherein the particle purging means further comprises:

a flow of inert gas across the window and out through the open end of the second member most proximate the atomization zone.

10. The system of claim 9, wherein the inert gas has a flow rate of about 1.5 kg per min.

11. The system of claim 1, wherein the monitoring means is positioned such that the intensity of near infrared light usable for providing images of the atomization zone is prevented from decreasing more than 50 percent during monitoring of the atomization process relative to the intensity thereof available to provide images prior to initiation of the atomization process.

12. The system of claim 1, wherein the monitoring means is positioned such that the intensity of near infrared light usable for providing images of the atomization zone is prevented from decreasing more than 20 percent monitoring of the during the atomization process relative to the intensity thereof available for providing images prior to initiation of the atomization process.

13. The system of claim 1, wherein the monitoring means is positioned such that the intensity of near infrared light usable for providing images of the atomization zone is prevented from decreasing more than 10 percent during the atomization process relative to the intensity thereof available for providing images prior to initiation of the atomization process.

14. The system of claim 1, wherein the monitoring means is positioned such that the intensity of near infrared light usable for providing images of the atomization zone is prevented from decreasing more than 5 percent during the atomization process relative to the intensity thereof available for providing images prior to initiation of the atomization process.

15. A viewing device for remotely monitoring an atomization zone having a plume during the atomization of liquid metal in a close coupled gas atomization system, the viewing device comprising:

an enclosure for containing the atomized metal;

a housing, operatively connected to the enclosure, for securing a sensor;

a sleeve having a conical channel formed therein, the conical channel having an included angle of about 10 to about 40 degrees;

a window, operatively positioned between the housing and the sleeve, for allowing the sensor to monitor the plume therethrough;

a passage, operatively formed in the sleeve and in communication with the window, for directing a gas flow over the window into the conical channel and out into the enclosure; and means for positioning the viewing device proximate the plume such that the plume is substantially undisturbed by the viewing device while providing for the continuous viewing of the atomization zone during the atomization process.

16. The device of claim 15, wherein the device is positioned about 20 millimeters from the axis which extends parallel to a melt guide tube into the atomization zone from the melt guide tube exit orifice.

17. The device of claim 15, wherein the device is positioned at least about 15 degrees from the axis which extends parallel to a melt guide tube into the atomization zone from the melt guide tube exit orifice.

18. The device of claim 15, wherein the narrow end of the conical channel has a diameter of about 0.6 to about 5 millimeters.

19. The device of claim 15, wherein the narrow end of the conical channel has a diameter sufficient to admit sufficient light to the sensor for monitoring the atomization zone.

* * * * *